United States Patent Office 3,414,634
Patented Dec. 3, 1968

3,414,634
COPOLYMERS OF VINYL GLYCIDYL ETHER
Howard Sorkin, Berkeley Heights, N.J., assignor to Air Reduction Company, Incorporated, New York, N.Y., a corporation of New York
No Drawing. Filed Oct. 22, 1965, Ser. No. 502,556
4 Claims. (Cl. 260—837)

ABSTRACT OF THE DISCLOSURE

Vinyl glycidyl ether of the formula

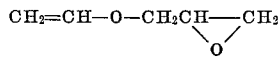

is copolymerized with trifluoroethyl vinyl ether to form a copolymer which may be cured.

---

This invention relates to a novel unsaturated compound and to a method for preparing the same.

Many thermoplastic polymers can be improved with respect to their mechanical properties by cross-linking with a polymerizable monomer, and various monomers are employed for this purpose.

It is an object of this invention to provide a polymerizable monomer which not only can be polymerized to form homopolymers, but which is particularly useful as a cross-linking agent for normally thermoplastic polymers.

In accordance with this invention, there is provided the monomer vinyl glycidyl ether. The monomeric compound of this invention can be represented by the formula

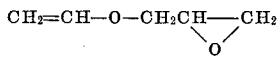

In general, the vinyl glycidyl ether of this invention can be formed by the action of glycidol upon a lower alkyl vinyl ether, e.g. a vinyl ether in which the alkyl group contains up to 6 carbon atoms. Particularly suitable is vinyl isopropyl ether, which has a boiling point which permits ready separation from the reaction mixture. The reaction is advantageously catalyzed by a mercury (II) salt of an organic or inorganic acid, such as mercuric acetate, mercuric sulfate, and the like. The reaction is most suitably carried out at reflux temperature at atmospheric pressure but it will be understood that higher or lower pressures can be employed, and that the reaction mixture can be heated at temperatures below the reflux temperature, although temperatures of at least about 50° C. should be employed.

The vinyl lower alkyl ether is suitably employed in substantial excess so that it functions not only as a reactant, but also as a solvent for the reaction. Thus, 3 to 10 moles of the vinyl lower alkyl ether are used per mole of glycidol, preferably at least 8 moles of vinyl lower alkyl ether per mole of glycidol.

It is thus not necessary to carry out the reaction in the presence of an additional solvent.

After the reaction has been completed to the desired extent, which ordinarily requires a reaction time of 12 to 24 hours, the vinyl glycidyl ether is readily recovered from the reaction mixture by fractional distillation. Since vinyl glycidyl ether has a boiling point of 133–134° C. at 760 mm., and since glycidol has a substantially higher boiling point, the ether is readily separated from any unreacted glycidol. On the other hand, when substantial excess quantities of the vinyl lower alkyl ether are employed, the principal separation is between the vinyl glycidyl ether and the vinyl lower alkyl ether. Thus, as previously mentioned, there is most advantageously used a vinyl lower alkyl ether which has a boiling point substantially different from that of vinyl glycidyl ether, such as vinyl isopropyl ether.

The following examples, which are given for illustrative purposes only, serve to show the preparation of the vinyl glycidyl ether of this invention and its use in polymer formation.

EXAMPLE 1

A mixture of 860 g. (10 moles) iso-propyl vinyl ether, 100 g. (1.35) moles) glycidol, and 25 g. mercuric acetate was stirred and refluxed for 16 hr. The condenser was then replaced by a simple Claisen head and 72.9 g. liquid boiling at 121–131° was collected. This was fractionated in a small Vigreux column, and four fractions were obtained:

| Fraction | B.P.(deg). | Wt. (g.) |
|---|---|---|
| A | 50–86 | 3.8 |
| B | 90–120 | 4.2 |
| C | 120–135 | 34 |
| D | High boiling residues | |

The fraction boiling at 125–135° was collected and subjected to a final fractionation in a 55-plate column to give 17.4 g. glycidyl vinyl ether, B.P. 133.5° C., $n_D^{25}$ 1.4356.

$C_5H_8O_2$ Calcd.: C, 59.97; H, 8.08. Found: C, 60.23; H, 8.09.

EXAMPLE 2

A solution of 100 g. trifluoroethyl vinyl ether, 1 g. glycidyl vinyl ether, and 1 g. azo-bis-iso-butyronitrile was refluxed for 26.5 hr. The solution was poured into hexane, the precipated polymer washed with hexane, and dried to yield 16 g. of a clear, colorless polymer.

$(C_4H_5F_3O)_9(C_5H_8O_2)$ Calcd.: C, 39.8; H, 4.29; F 41.60. Found: C, 39.15; H, 4.25; F, 41.60.

EXAMPLE 3

A solution of 100 g. trifluoroethyl vinyl ether, 3 g. glycidyl vinyl ether, and 1 g. azo-bis-iso-butyronitrile was refluxed for 26.5 hr., and treated as described in Example 2. The yield was 15.2 g.

$(C_4H_5F_3O)_{14}(C_5H_8O_2)$ Calcd.: C, 39.3; H, 4.18; F, 42.90. Found: C, 39.81; H, 4.26; F, 42.80.

The vinyl glycidyl ether is polymerizable to form homopolymers and is also polymerizable with various monoethylenically-unsaturated monomers other than trifluoroethyl vinyl ether, including other vinyl ethers, such as ethyl vinyl ether, butyl vinyl ether, octyl vinyl ether, hydroxyethyl vinyl ether, aminoethyl vinyl ether, aminopropyl vinyl ether, dimethyl-aminoethyl vinyl ether, vinyloxyethoxy-ethanol, and vinyloxy-propoxyethanol; vinyl esters of carboxylic acids such as acetic, propionic, butyric, and the like, vinyloxyalkyl esters such as vinyloxyethyl acetate, and the like, acrylic acid, methacrylic acid, esters of acrylic acid or methacrylic acid and monohydric alcohols such as methyl, ethyl, butyl, octyl, dodecyl, cyclohexyl, undecenyl, cyanoethyl, dimethylaminoethyl, and the like, esters of itaconic acid and similar alcohols; esters of maleic or fumaric acids, and similar alcohols; vinyl sulfides, such as methyl, ethyl, propyl, and n-butyl, vinyl sulfides, hydroxy-ethyl vinyl sulfide, vinyl thioglycerol, vinyl a-thioethyl acetate, methacrylonitrile or acrylonitrile, acrylamide, or methacrylamide, and like N-substituted amides, vinyl chloride, vinyl bromide, vinylidene chloride, 1-chloro-1-fluoroethylene, or ethylene, or styrene. It is also suitable for cross-linking of various copolymers such as a vinyl acetate-ethylene copolymer. The quantity of vinyl glycidyl ether used in copolymerization or cross-linking can vary depending upon the intended use of the resulting polymerization product. Ordinarily at least about 0.1% of vinyl glydicyl ether, based upon the total product is used, but the amount may be 10% or higher.

Polymerization is suitably effected by means of any catalyst effective to polymerize vinyl ethers such as the well-known free-radical-producing catalysts, including not only the catalyst used in Examples 2 and 3 but also other azo compounds such as disclosed in Hunt U.S. Patent No. 2,471,959, and including the various conventional organic and inorganic peroxides, such as hydrogen peroxide, benzoyl peroxide, tertiary butyl peroxide, and the like. From 0.1% to 3% or more of the catalyst may be used based on the total weight of the monomer or monomers.

The polymers resulting from the polymerization or copolymerization of glycidyl vinyl ether are suitable as coating compositions for application to metal, wood, paper, or other substrate. They are particularly effective when cured by means of a basic epoxy resin curing catalyst, such as a tertiary amine, e.g. diethylenetriamine. The glycidyl vinyl ether-trifluoroethyl vinyl ether polymer such as produced in Examples 2 and 3 has desirable dielectric properties and is advantageously cured with a basic epoxy resin curing catalyst, particularly when mixed with a small amount of e.g. up to 25% by weight, of a conventional liquid epoxy resin, as shown in the following example.

EXAMPLE 4

A mixture of 4 parts of the glycidyl vinyl ether-trifluoroethyl vinyl ether polymer produced in Example 2 and 22% by weight of Araldite 6010 was heated to about 60° C. in an aluminum cup under a heat lamp. Diethylenetriamine (0.35 parts) was added and heating was continued at 60° C. for 2 hours. Araldite 6010 is a well-known liquid epoxy resin as described in "Epoxy Resins" by Irving Skeist (Reinhold Publishing Corporation, New York) pp. 18–21. The cured product was acetone soluble. The polymer was dissolved in acetone, concentrated to a thick paste and poured into an aluminum ring floating on mercury. The film was dried in air for 48 hours.

A similar mixture of 7 parts of the polymer of Example 1 and 12.5% by weight of Araldite 6010 was heated by means of a heat lamp to 60° C. Diethylene triamine (0.25 parts) was added and the mixture poured onto an aluminum foil sheet. Heating was continued for 4 hrs. at 80° C. The cured product was not soluble in acetone.

The two cured products were tested for dielectric properties and were found to have dielectric constants ($E'$) of about 16 and 12, respectively, at frequencies up to 1000 cycles.

It will be apparent to those skilled in the art that various changes and modifications may be made in the embodiments described above without departing from the invention, as defined in the appended claims. For example, liquid epoxy resins other than Araldite 6010 may be employed in making cured compositions from the copolymers of vinyl glycidyl, ether, such as described on pp. 18–19 of Skeist. Similarly, basic epoxy resin curing catalysts other than diethylenetriamine may be used. Various basic epoxy resin curing catalysts are described for example in Skeist, e.g. on page 21 et seq. (Chapter 3).

It is intended, therefore, that all matter contained in the foregoing description shall be interpreted as illustrative only and not as limitative of the invention.

I claim:

1. A copolymer of vinyl glycidyl ether of the formula

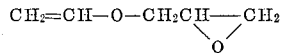

and trifluoroethyl vinyl ether.

2. A cured interpolymer of glycidyl vinyl ether of the formula

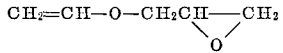

with trifluoroethyl vinyl ether.

3. The product resulting from the polymerization of glycidyl vinyl ether of the formula

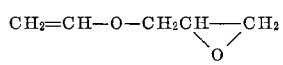

and trifluoroethyl vinyl ether, a liquid epoxy resin which is a polyglycidyl ether of a polyhydric phenol and a basic epoxy resin curing catalyst.

4. A product as defined in claim 2 characterized by a dielectric constant of at least about 12 at frequencies up to 1000 cycles.

References Cited

UNITED STATES PATENTS 3,203,939   8/1965   Tinsley et al. _____ 260—881

MURRAY TILLMAN, *Primary Examiner.*

P. LIEBERMAN, *Assistant Examiner.*